United States Patent [19]

Strand

[11] Patent Number: 5,399,851
[45] Date of Patent: Mar. 21, 1995

[54] FAILSAFE SENSING EDGE FOR AUTOMATIC DOORS AND GATES HAVING A U-SHAPED OUTER COVERING AND AN ELONGATED ACTUATING MEMBER

[75] Inventor: Charles G. Strand, Melville, N.Y.

[73] Assignee: Link Controls, Inc., Ronkonkoma, N.Y.

[21] Appl. No.: 63,714

[22] Filed: May 20, 1993

[51] Int. Cl.6 .............................................. G01V 9/04
[52] U.S. Cl. .................... 250/222.1; 250/221; 49/26
[58] Field of Search ............ 250/222.1, 222.2, 223 R, 250/221; 49/26, 27

[56] References Cited

U.S. PATENT DOCUMENTS 4,423,998  1/1984  Inaba et al. ............... 250/222.1
4,958,068  9/1990  Pong et al. ............... 250/222.1

Primary Examiner—David C. Nelms
Assistant Examiner—Que T. Le
Attorney, Agent, or Firm—Galgano & Burke

[57] ABSTRACT

A failsafe or self-monitoring sensing edge for an overhead door includes a channel mounted on the bottom edge of the door having a pair of downwardly extending arms which are spaced apart. An outer covering of soft material is attached to the channel for enclosing the arms. The covering supports within a rigid, separate free-floating actuating member extending upwardly through the arms. On one end of the channel is a light source and the other end is a photoswitch. When the covering is depressed upwardly as a result of an obstacle in the path of the door, the actuating member blocks the light beam and the photoswitch gives off a signal, which can be used to terminate or reverse motion of the door.

10 Claims, 2 Drawing Sheets

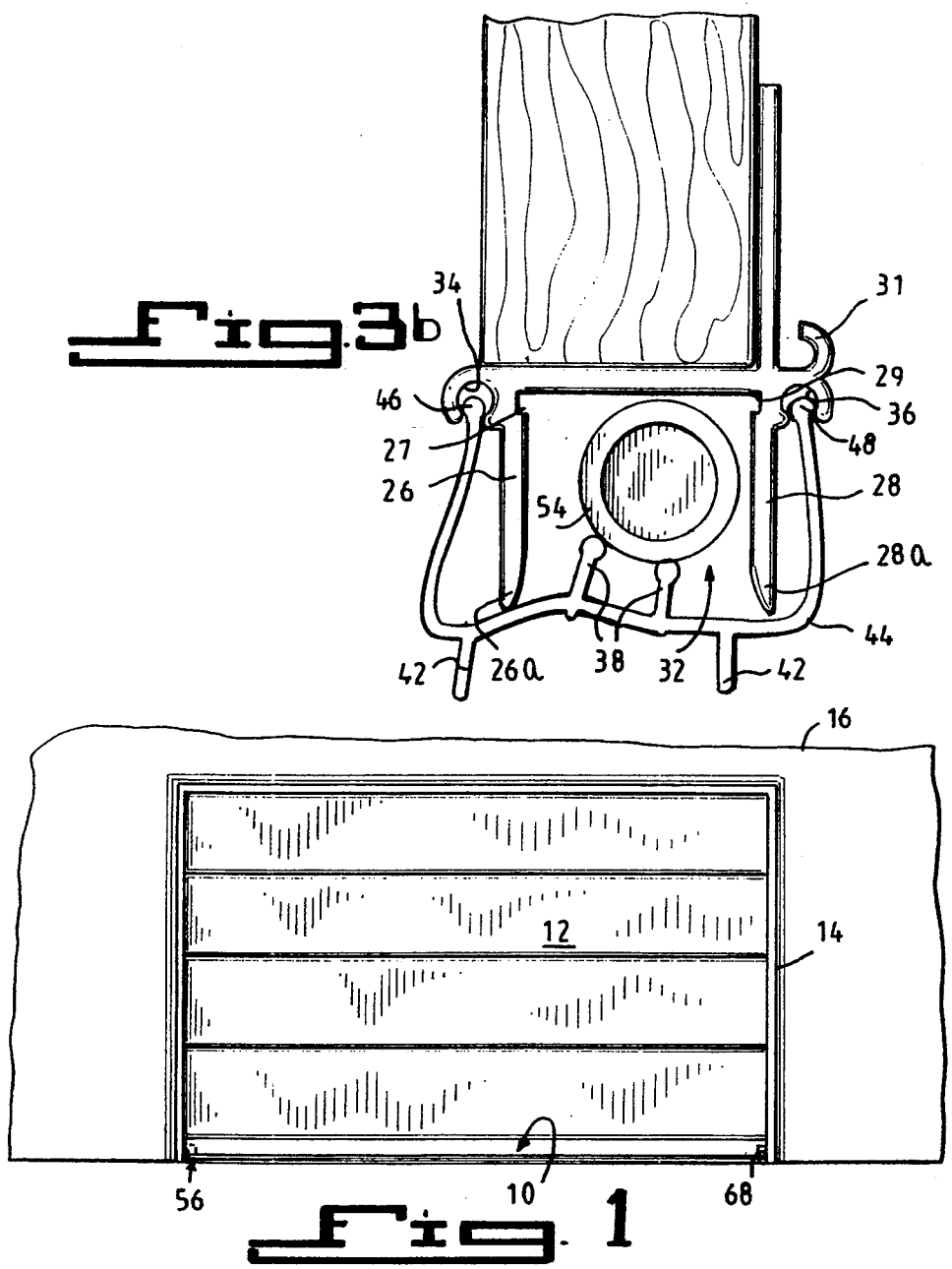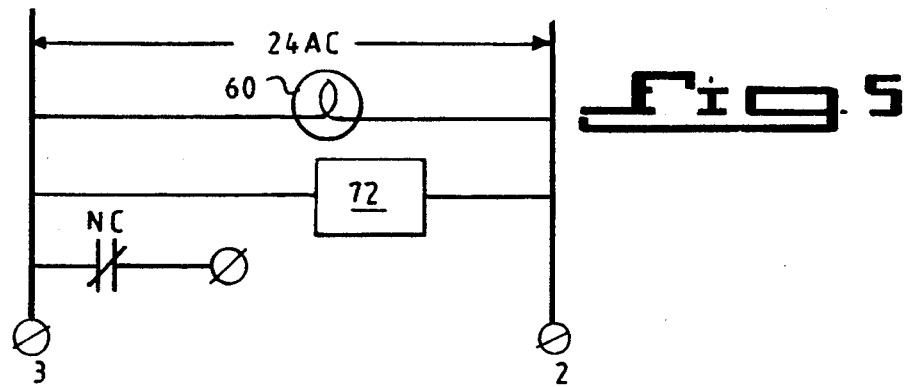

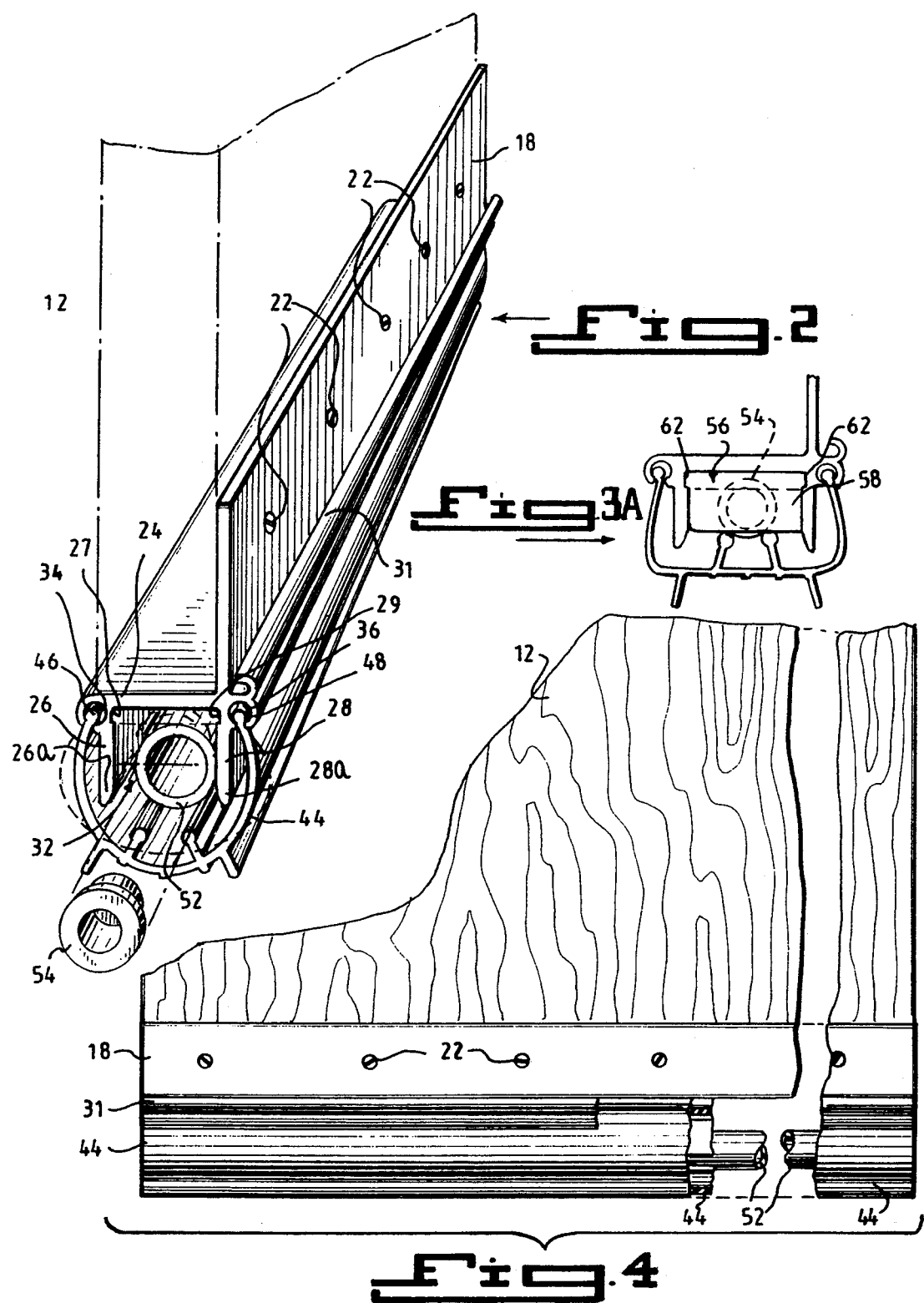

FAILSAFE SENSING EDGE FOR AUTOMATIC DOORS AND GATES HAVING A U-SHAPED OUTER COVERING AND AN ELONGATED ACTUATING MEMBER

BACKGROUND OF THE INVENTION

1. Field of the Invention

The present invention relates to a failsafe sensing edge for use with automatic doors and gates.

2. The Prior Art

The use of safety devices on automatically operating doors and gates is well-known. In a usual such arrangement, for example, the door will automatically retract when an object interferes with is closing. The accepted meaning of "failsafe" in the industry is self-monitoring.

Typical designs for accomplishing this result include the use of lights with photoelectric detectors and switches which close on contact with the interfering object.

The drawbacks of arrangements currently in use include problems caused by the presence of dust, dirt and ambient lighting in photoelectric systems, and problems with humidity and moisture in the case of switches mounted in sealed electrical door edges.

A variety of United States patents have issued which disclose such safety devices.

U.S. Pat. No. 2,791,654 discloses a combined safe edge and sight guard for elevator doors using a microswitch which is closed when a cushioned edge is depressed by an interfering object.

U.S. Pat. No. 3,001,038 shows an overhead closure safety halting system utilizing an actuating bar mounted on the leading edge of the garage door to close a switch when interference occurs.

U.S. Pat. No. 3,003,303 illustrates a pneumatic safety edge for power operated doors designed to avoid the use of electrical switches. In this design, pneumatic tubes in the leading edge of the door are compressed upon making contact with an object, with a consequent increase in pressure which is transferred to a sensor located away from the door to energize the safety system.

U.S. Pat. No. 3,462,885 discloses a safety edge for a door which employs a pair of electrical conductors mounted in a compressible door edge to make contact upon the edge being compressed by an object.

U.S. Pat. No. 4,115,952 shows a safety door edge which employs a flexible channel along the door edge containing a pair of contacts which come together when the channel is compressed.

U.S. Pat. No. 4,452,009 uses a light barrier and light receivers and sender. In this arrangement, the light exit locations are cleaned each time the door is used.

U.S. Pat. No. 4,773,183 shows a contact sensitive apparatus for a power window or sun roof in which a sealed tube is employed containing a fluid which communicates with a controller to sense an interfering object.

U.S. Pat. No. 4,944,116 describes a sensor strip which acts as a light guide emitter and sensor. When the strip is distorted, it interferes with light transmission.

U.S. Pat. No. 4,953,608 discloses a safety device for roll-up doors relying on photoelectric cells.

None of the aforementioned patents teaches or suggests the present invention.

In my earlier patent, U.S. Pat. No. 5,079,417, an improved sensing edge for automatic doors and gates is disclosed, which is resistant to adverse environmental conditions such as dirt, dust, moisture, etc., and is failsafe, that is, if the edge if damaged, it can be configured to prohibit motorized operation.

The device consists of an extruded, plastic channel mounted on the leading edge of an automatic door or gate. A light source is mounted within one end of the channel and a photoswitch is mounted in the opposite end of the channel. An actuator is supported in the channel in a manner which will permit it to block the light beam when the sensing edge makes contact with an object.

While the device of my earlier invention works well, improvements have been made thereto to enhance its failsafe operation.

It is, thus, a principal object of this invention to provide an improved, failsafe or self-monitoring, sensing edge for automatic doors and gates.

It is a more particular object of the present invention to provide a more highly effective actuator for such a sensing edge.

SUMMARY OF THE INVENTION

Certain of the foregoing and related objects are readily attained according to the present invention by the provision of a sensing edge for an overhead door or gate having a door edge which includes a channel means for mounting along the edge of the door or gate, the channel means having a pair of projecting, spaced-apart arms forming a generally U-shaped, slot-like opening therebetween, extending the length of the channel means, generally parallel to the door edge. Outer covering means are supported on the channel means enclosing the arms, the outer covering means being made out of a flexible material readily depressed when an obstacle is encountered when the door or gate is closing. A free-floating, relatively rigid, elongated actuating member is enclosed by the outer covering means and the channel means which member is normally spaced from the door edge between the arms of the channel. A light source means is mounted on one end of the channel means for directing a light beam down the length of the channel means between the arms and in the space between the actuating member and the channel means when the outer covering means is in its normal, undepressed state, the actuating member means blocking the light beam when the outer covering means is depressed by an obstacle in the path of the door or gate when being closed. Photoswitch means are mounted on the other end of said channel means for receiving the light beam so that interruption of the light beam will actuate the photoswitch means.

Preferably, the actuating member comprises a hollow, cylindrical tube having end caps sealing off the ends thereof. Most desirably, the outer covering means has a plurality of spaced-apart ribs on which the actuating member normally rests.

Most advantageously, the spaced-apart arms of the channel means have rounded lower ends, the inner faces of which are outwardly flared. Most preferably, the outer covering means has at least a pair of spaced-apart, downwardly projecting feet for sealably engaging a ground surface.

BRIEF DESCRIPTION OF THE DRAWINGS

Other objects and features of the present invention will become apparent from the following detailed description considered in connection with the accompanying drawings which disclose one embodiment of the present invention. It should be understood, however, that the drawings are designed for the purpose of illustration only and not as a definition of the limits of the invention.

In the drawings, wherein similar reference characters denote similar elements throughout the several views:

FIG. 1 is a front elevational view of a garage and overhead door, the latter of which is provided with a sensing edge of the present invention;

FIG. 2 is an enlarged, exploded perspective view of the sensing edge embodying the present invention shown mounted on an overhead door, the operating position thereof shown in phantom line;

FIG. 3a is a lateral end view of the sensing edge shown in FIG. 1, with the actuating member in an operative position behind the light source assembly;

FIG. 3b is an enlarged lateral end view of the overhead door and sensing edge, with the actuating member in an operative position, and with the light source assembly removed;

FIG. 4 is a fragmentarily-illustrated front elevational view, in part section, showing an overhead door having a sensing edge mounted thereon; and FIG. 5 is a schematic of the electrical circuit for carrying out the purposes of this invention.

DESCRIPTION OF THE PREFERRED EMBODIMENT

Referring to FIG. 1, a sensing edge designated 10 incorporating the principles of this invention is shown mounted along the lower edge of an overhead door 12 located within the doorway 14 of a building 16.

As seen in FIG. 2, sensing edge 10 consists of a rigid channel 18 which is L-shaped and may be attached to the bottom of door 12 by any convenient means, such as screws 22.

Channel 18 may be constructed of a rigid plastic material, such as PVC extrusion, as is understood in the art. The leg 24 of channel 18 is provided with a pair of downwardly extending arms 26 and 28 with lower rounded ends 26a, 28a having outwardly-flared inner edges, which arms 26, 28 cooperate to define therebetween a slot-like channel or opening 32 extending the length of channel 18. In addition, there are formed a pair of extended pockets 34 and 36 on the opposite outer sides of arms 26 and 28 and a pair of recessed seats 27, 29 on the upper inner sides of arms 26 and 28, for purposes to be described hereinafter.

Mounted over legs 26 and 28 of channel 18 is a U-shaped outer covering 44 having its upper arms terminating in swelled edges 46 and 48, which are inserted in pockets 34 and 36, respectively, as illustrated, to support outer covering 44 in the manner shown. Outer covering 44 is what is known in the trade as a rubber or vinyl extrusion, which will readily collapse upwardly when door 12 contacts an obstacle when it is being closed. It encloses and supports a cylindrical actuating member 54, which extends the length of channel 18 and which normally rests on two spaced-apart, upwardly extending arms 38 of covering 44, the latter of which also has two spaced-apart, downwardly extending feet 42 which normally contact the ground or an obstacle. The cylindrical actuating member is provided with end caps 54 which seal and close off its ends. Actuating member 52 passes through slotted opening 32. Actuating member 54 is sized and dimensioned such that when outer covering 44 is in its default (unstressed) condition illustrated, that is, not compressed, there is a space between the top of actuating member 52 and the bottom of leg 24 to permit a light beam to travel the length of channel 32.

At one end of channel 32 is mounted a light source assembly 56, consisting of a housing 58 containing the light source 60 (See FIG. 5), either LED or infrared. The housing 58 has a pair of upper flanges 62 by which it is slidably mounted within recessed seats 27, 29 of arms 26 and 28. Similarly, photoswitch assembly 68 containing a suitable photoswitch 72 and associated electronics is mounted on the opposite end of channel 32 in a comparable manner. The light source assembly 60 and photoswitch assembly 68 would be connected by electrical wiring (not shown) mounted in the upper C-shaped flange 31 of channel 18 to supply power, the construction and operation of which is more fully described in my earlier patent, U.S. Pat. No. 5,079,417, the subject matter of which is incorporated herein by reference thereto.

It will be seen that, in this construction, light source assembly 56, channel 18 and photoswitch assembly 68 comprise a rigid structure when, once put together properly, require no adjustment to line up the light beam, and will remain properly aligned while in use.

As best seen also in FIG. 3, actuating member 54 is shortened at each end so that when outer covering 44 encounters an obstacle, actuating member 54 will clear light source and photoswitch assemblies 56 and 68.

As has already been noted, one end of channel 18 is provided with a light source 60, while the opposite end of the channel is provided with a photoswitch 72. When door 12 is in normal use, there will be an uninterrupted light from the source to the photoswitch. When door 12, while closing, encounters an obstacle, outer covering 44 will be depressed upwardly, forcing actuating member 54 up to block the light, thereby actuating photoswitch 72. As is understood in the art, such actuating may be utilized to deactivate the motor driving door 12, and even to reverse its direction of motion, if desired.

While any conventional electrical system may be utilized to carry out this function, one such circuit which can be used is shown in FIG. 5. Light source 60 and photoswitch 72 are energized by a 24 vac source. Contact 1 is connected to the door closing circuit (not shown) of the operator through a normally closed relay NC. Relay NC is kept closed by photoswitch 72 while the latter is receiving a light beam. When photoswitch 72 fails to receive a light beam due either to blocking of the rays by actuator 54, or if the light source fails, relay NC will open. This can be used to turn off a relay (not shown), whose NC contact is connected across the safety-to-open (reverse if closing) operator input. In this way, the system becomes failsafe under loss of power or a disconnection from the operator to the sensing edge.

In the installation and operation of sensing edge 10, the device must be installed onto the leading edge of a motorized door or gate 12. This is done by cutting the extruded channel 18, outer covering 44 and extruded actuator 54 to the correct length, inserting actuator 54 into slot 32 of channel 18, and fastening the assembly to the door 10 or gate with screws 22 or other fastening means.

The installer must cut off a piece of the actuator 54 at both ends (approximately 1 inch) to prevent the motion of actuator 54 from being blocked by assemblies 56 and 68, which are inserted into the ends of channel 18 and locked into place. The photoswitch and electronic signal processing circuitry will then be installed, the wiring being routed in channel finger or C-shaped flange 31, and will receive electrical power by way of a conductor (not shown), exiting from one side. The output of photoswitch 72 will be connected to the door or gate operator by means of a coiled cord or other similar device (not shown). A small junction box (not shown) can be mounted on the door or vertical edge of channel 18 for connection of the coil cord to the 3-wire conductor. The details of the electrical system do not form a part of this invention. Flexible foam rubber inserts (not shown) may be inserted and glued into the open ends of outer covering 44 to keep dirt out of the actuator mechanism.

Whenever moving door or gate 12 strikes an object or person in the path of travel, the light beam is blocked by action of actuator 54 moving into its path and a signal is sent to the operator. This signal can be processed to instruct the motor to reverse the door or gate away from the obstruction.

The free-floating actuating member 54 of the present invention enables the device to better cope with an obstacle encountered at an angle. As seen in FIG. 3a, if the obstacle is directly underneath the sensing edge, the outer covering 44, and its support ribs 38 will move upwardly and normally relative to the ground, causing the tubular actuating member 54 to interrupt the light signal. However, as shown in FIG. 3b, even if the obstacle is at an angle, the free floating actuating member 54 will still be forced upwardly between the arms 26, 28, aided by the rounded and tapered ends thereof 26a, 28a), albeit at a slight angle, and this is true even if only one of the ribs 38 contacts the actuating member 54. As can be appreciated, the flared lower ends of arms 26a, 28a facilitate guidance and proper functioning of the actuating member 54. The "free-floating" arrangement of the actuating member affords significantly greater operational reliability for the sensing edge, in comparison to the fixed arrangement of my earlier system wherein the actuator was fixed or integral with the outer covering 44.

It is also preferable to employ a microprocessor-based electronic circuitry to incorporate a self-adjusting signal strength from the light source. This eliminates the need for adjustment potentiometers to compensate for the relatively wide range of door widths, which translates to edge lengths of from 5' to 40'. It also compensates for lens degradation and dust and dirt build-up on the lens over extended periods of time.

While only one preferred embodiment of this invention has been described and illustrated, it is understood that many variations of this invention are possible without departing from the principles of this invention.

What is claimed is:

1. A sensing edge for an overhead door or gate having a door edge comprising:
   (a) channel means for mounting along the edge of said door or gate, said channel means having a pair of projecting, spaced-apart arms forming a generally U-shaped, slot-like opening therebetween, extending the length of said channel means, generally parallel to said door edge;
   (b) outer covering means supported on said channel means enclosing said arms, said outer covering means being made out of a flexible material readily depressed when an obstacle is encountered when said door or gate is closing;
   (c) a free-floating, relatively rigid, elongated actuating member enclosed by said outer covering means and said channel means which member is normally spaced from said door edge between said arms of said channel;
   (d) a light source means mounted on one end of said channel means for directing a light beam down the length of said channel means between said arms and in the space between said actuating member and said channel means when said outer covering means is in its normal, undepressed state, said actuating member means blocking said light beam when said outer covering means is depressed by an obstacle in the path of said door or gate when being closed; and
   (e) photoswitch means mounted on the other end of said channel means for receiving said light beam so that interruption of said light beam will actuate said photoswitch means.

2. The sensing edge of claim 1, wherein said actuating member comprises a hollow, cylindrical tube having end caps sealing off the ends thereof.

3. The sensing edge of claim 1, wherein said outer covering means has a plurality of spaced-apart ribs on which said actuating member normally rests.

4. The sensing edge of claim 1, wherein said channel means is L-shaped, with one leg for mounting flush against the side of said door or gate and the other leg for mounting flush along said door edge, said arms projecting from said other leg and away from said door edge.

5. The sensing edge of claim 4, wherein said other leg of said channel means is provided with pockets extending the length of said channel means on opposite sides of said arms, said outer covering means having extended swelled edges pressed into said pockets for supporting said outer covering means.

6. The sensing edge of claim 5, wherein circular shoulders form said pockets, at least one of said shoulders shaped protruding outwardly from the surface of said door or gate and having means extending from one of said shoulders for accommodating the insertion and removal of wiring from one side to the other side of said door or gate.

7. The sensing edge of claim 6, wherein said accommodating means comprises a crooked finger for extending parallel to the surface of said door or gate and bent inwardly at the tip thereof to form a space for trapping said wiring.

8. The sensing edge of claim 1, further including means sealing the ends of said outer covering means capable of being compressed when said covering means is depressed by an obstacle.

9. The sensing edge of claim 1, wherein said spaced-apart arms of said channel means have rounded lower ends, the inner faces of which are outwardly flared.

10. The sensing edge of claim 1, wherein said outer covering means has at least a pair of spaced-apart, downwardly projecting feet for sealably engaging a ground surface.

* * * * *